(12) United States Patent
Gilstrap et al.

(10) Patent No.: US 7,000,813 B2
(45) Date of Patent: Feb. 21, 2006

(54) SEATPOST MOUNTED BICYCLE WHEEL HOLDING DEVICE

(76) Inventors: Keith Gilstrap, 1818 Colorado Ave. #103, Glenwood Springs, CO (US) 81601; Doug Golenz, 942 Sunflower St., Louisville, CO (US) 80027

( * ) Notice: Subject to any disclaimer, the term of this patent is extended or adjusted under 35 U.S.C. 154(b) by 169 days.

(21) Appl. No.: 10/613,343

(22) Filed: Jul. 2, 2003

(65) Prior Publication Data

US 2005/0000989 A1    Jan. 6, 2005

(51) Int. Cl.
*B62J 11/00* (2006.01)
(52) U.S. Cl. ............ 224/427; 224/42.24; 224/425; 224/447; 224/448; 224/449; 224/463
(58) Field of Classification Search ........... 224/42.24, 224/420, 421, 425, 426, 427, 447, 448, 449, 224/451, 457, 458, 463
See application file for complete search history.

(56) References Cited

U.S. PATENT DOCUMENTS

| 577,910 | A | 3/1897 | Bierbach |
|---|---|---|---|
| 672,540 | A | 4/1901 | Speir |
| 1,203,398 | A | 10/1916 | Perkins |
| 1,234,409 | A | 7/1917 | Strifler |
| 1,442,285 | A | 1/1923 | McKay et al. |
| 1,577,792 | A | 3/1926 | Duck et al. |
| 1,839,997 | A | 1/1932 | Rutledge |
| 1,886,549 | A | 11/1932 | Howell et al. |
| 3,338,484 | A | 8/1967 | Hall, Sr. |
| 4,437,597 | A | 3/1984 | Doyle |
| 5,056,822 | A * | 10/1991 | Shim .................. 224/276 |
| 5,085,360 | A | 2/1992 | Fortune et al. |
| 5,190,345 | A * | 3/1993 | Lin .................. 224/427 |
| 5,242,183 | A | 9/1993 | Oberg et al. |
| 5,405,113 | A * | 4/1995 | Jaw .................. 224/425 |
| 5,437,171 | A | 8/1995 | Owen |
| 5,467,906 | A | 11/1995 | Forman |
| 5,558,261 | A | 9/1996 | Hedeen |
| 5,588,661 | A | 12/1996 | Wolfe |
| 5,639,001 | A | 6/1997 | Brady |
| 5,678,796 | A | 10/1997 | James |
| 5,692,659 | A | 12/1997 | Reeves |
| 5,702,040 | A | 12/1997 | Hedeen |
| 5,779,119 | A | 7/1998 | Talbot et al. |
| 5,810,231 | A | 9/1998 | Kravitz |
| 5,836,492 | A | 11/1998 | Allen |
| 6,336,649 | B1 | 1/2002 | Lin |
| 6,523,848 | B1 * | 2/2003 | Liu .................. 280/293 |

* cited by examiner

*Primary Examiner*—Gary E. Elkins
(74) *Attorney, Agent, or Firm*—Leyendecker & Lemire, LLC; Kurt Leyendecker

(57) ABSTRACT

A wheel holding device for attaching to one or both a handlebar or a stem of a bicycle is described. In one embodiment, the device holds and secures the front wheel of a bicycle that has been removed from the bicycle's front fork for use when transporting the bicycle on a rooftop carrier of an automobile.

27 Claims, 4 Drawing Sheets

SEATPOST MOUNTED BICYCLE WHEEL HOLDING DEVICE

RELATED APPLICATIONS

U.S. Pat. No. 6,817,502 entitled "Bicycle Wheel Holder" filed on Aug. 23, 2002; patent application Ser. No. 10/613,339 entitled "Handlebar/Stem Mounted Bicycle Wheel Holding Device" filed concurrently with this application; and patent application Ser. No. 10/613,338 entitled "Bicycle Wheel Bag" also filed concurrently with this application are all commonly owned along with this application and are hereby incorporated by reference in their entirety herein.

FIELD OF THE INVENTION

This invention relates generally to a device for holding a bicycle wheel. More specifically, the invention relates to a device removably mountable to a bicycle seatpost or bicycle frame tube for carrying a bicycle wheel such as during transport of the bicycle.

BACKGROUND

Many types of rooftop bicycle carriers (or racks) require the front wheel of a bicycle be removed when mounting the bicycle on the carrier. The front wheel is typically stowed in the vehicle or is secured to the rooftop carrier using a separate fixture that clamps to the wheel at its axle. As can be appreciated, the wheel may be dirty, especially if the wheel is from a mountain bike, and putting a dirty wheel in the vehicle is often undesirable. The separate wheel fixtures that mount directly to the carrier are also often undesirable because they can be expensive and take up limited rooftop space that could otherwise be used to carry additional bicycles.

Several wheel holders have been proposed to secure the front wheel while the bicycle is being transported on a rooftop carrier. In U.S. Pat. No. 5,588,661 of Wolfe, a bracket is disclosed that is affixed to the rear dropout of a bicycle frame. When the bicycle is placed on the rooftop carrier, the axle of the front wheel is secured into a slot provided in the bracket by tightening the wheel's quick release mechanism. The bracket has several drawbacks. First, it is not easily removable from the bicycle and is intended to remain on the bicycle adding unnecessary weight. Second, since the front wheel is supported at the axle on only one side of the axle, the stress on the axle from the weight of the wheel and wind load during transport could cause damage to the axle and the wheel's hub.

In U.S. Pat. No. 5,779,119 of Talbot, a wheel holder is disclosed that is secured onto the seatpost of a bicycle and includes an extension leg with spaced fingers extending therefrom. The fingers have slots formed in their distal ends and the slots are adapted to receive the axle of the bicycle's front wheel. The holder requires the use of a clamping mechanism to secure it to the seatpost. While Talbot clamping mechanism may be effective in attaching the holder to the bicycle's seatpost, it requires several interconnected moving parts that increase the total cost to produce the holder, especially when compared to a holder with an attachment mechanism that does not include interconnected moving parts. Further, since the fingers of the Talbot holder are shorter than the radius of the front wheel, the extension leg of the holder must be passed through the spokes of the intended bicycle wheel so that the spaced slots can be aligned with the ends of the wheel's axles. As can be appreciated, passing the extension arm through the spokes with the slotted fingers that extend perpendicularly therefrom can be awkward especially when the associated front wheel includes closely spaced spokes. Finally, the design of the Talbot holder requires the device to extend generally in a direction generally perpendicular to the bicycle. Given this configuration, the wheel and the end of the extension arm could interfere with the mounting of additional bicycles onto an associated rooftop carrier, especially when more than two bicycles are to be transported by a single carrier.

SUMMARY OF THE INVENTION

In a first preferred embodiment, a device for securing a bicycle wheel to a bicycle comprises a first arm section with proximal and distal ends. A first dropout is attached to the distal end of the first arm section and the first dropout includes a first slot. The first slot is adapted to receive an end of an axle of the bicycle wheel therein. The device also includes a second arm section with proximal end distal ends. The distal end of the second arm section is spaced from the distal end of the first arm section. A second dropout is attached to the distal end of the second arm section and the second dropout includes a second slot. The second slot is adapted to receive the other end of the axle of the bicycle wheel therein. The first and second slots are substantially aligned with each other. Additionally, the device also comprises an attachment section. The attachment section is (i) coupled with the proximal ends of the first and second arms, and (ii) adapted to couple with a seatpost of a bicycle without the use of a clamping mechanism.

In a second preferred embodiment, a device for securing a bicycle wheel to a seatpost of a bicycle comprises (i) an attachment section adapted to couple to the seatpost, (ii) a first arm section with proximal and distal ends, and (iii) a second arm section with proximal and distal ends. The first arm section has a length greater than the radius of the bicycle wheel and is coupled with the attachment section. A first dropout is attached to the distal end of the first arm section. The first dropout includes a first slot. The first slot is adapted to receive an end of an axle of the bicycle wheel therein. The second arm section also has a length greater than the radius of the bicycle wheel and is also coupled with the attachment section. The distal end of the second arm section is spaced from the distal end of the first arm section and a second dropout is attached to the distal end of the second arm section. The second dropout includes a second slot that is adapted to receive another end of the axle of the bicycle wheel therein. The first and second slots are substantially aligned with each other.

In a third preferred embodiment, A device for securing a front bicycle wheel to a bicycle when the bicycle is attached to a vehicle mounted bicycle rack for transport comprises a seatpost attachment mechanism that is adapted to couple with a shaft of a seatpost. The attachment mechanism does not include a clamping mechanism. The device also includes a bicycle wheel attachment mechanism adapted to secure the front bicycle wheel to the device. The seatpost attachment mechanism and the bicycle wheel attachment mechanism are coupled with each other.

In a fourth preferred embodiment, a method for attaching a bicycle wheel to a bicycle method comprises attaching a wheel attachment device to the seatpost of the bicycle without the use of a clamp, and securing the bicycle wheel to the wheel attachment device.

Numerous other embodiments and variations of the embodiments are also contemplated as is provided in this specification including the appended claims and as would be obvious to one of ordinary skill in the art with the benefit of this disclosure.

DETAILED DESCRIPTION

A device for attaching to a seatpost of a bicycle and holding a bicycle wheel is described. Variations of the device can, however, also be adapted to attach to a tube of a bicycle frame. Preferably, the device can be utilized to hold a front wheel of a bicycle when the bicycle with the front wheel removed from the front fork dropouts is mounted on a rooftop carrier of an automobile for transport. In one preferred embodiment, the device comprises a wireform attachment section for connecting to the seatpost, two extension arm sections that extend from the attachment section and two spaced and opposed dropouts with axle slots at the end of the arms to receive the ends of an axle of a bicycle wheel therein. The wireform attachment section of the preferred embodiment is adapted for quick attachment and removal to and from a seatpost.

Terminology

The term "or" as used in this specification and the appended claims is not meant to exclusive rather the term is inclusive meaning "either or both".

One Preferred Embodiment

Figure 1:
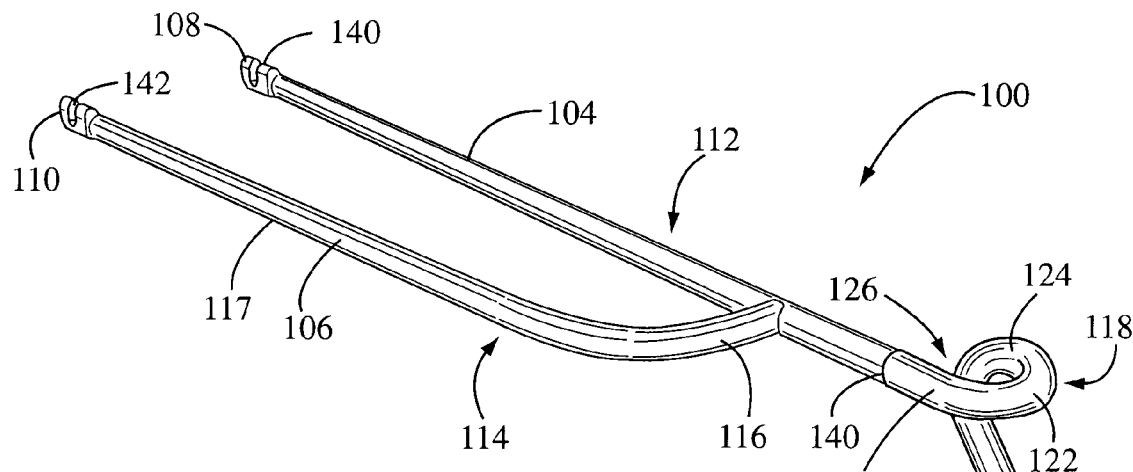
FIG. 1 is an isometric view of a preferred embodiment of the wheel holding device.

FIG. 1 is an illustration of one preferred embodiment of the device 100. The device includes (i) an attachment section 102 (or portion) typically comprising specifically bent and formed metallic rod to fit around a shaft of a seatpost (ii) first and second extension arm sections 104 & 106 (or portions) also typically comprised of metallic rod and (iii) dropouts 108 and 110 attached to ends of the arm sections for receiving the ends of an axle of a bicycle wheel therein. The metallic rod utilized for both the attachment and the extension arm sections is typically comprised of steel having a diameter of about 0.375"–0.50", although in variations, the material could comprise an aluminum alloy, titanium alloy, magnesium alloy or other metal. Further, although the rod is typically cylindrical, other cross-sectional shapes can be utilized. The rod may be solid or tubular. Additionally, in variations, the rod comprising the attachment and extension arm sections could be comprised of a plastic material reinforced with glass fibers, graphite fibers or another suitable reinforcing material. While the metallic rod can be bent and into the wire formed configuration of the attachment section that is illustrated, the attachment section and the other sections of the device can also be cast, forged, or molded as well.

Referring to FIG. 1, the attachment section 102 and a first extension arm section 104 are comprised of a single first rod 112 having a distal end that terminates at the first dropout 108. The rod is substantially straight along the portion comprising the first extension arm section and is formed into a plurality of arcuate portions in the attachment section before terminating at the proximal end thereof. A L-shaped second rod 114 is attached to the first rod 112 at the free end of the short leg 116 of the second rod generally proximate the transition between the first extension arm section 104 and the attachment section 102 on the first rod. In the illustrated preferred embodiment, the second rod is attached to the first rod via a weld, although in variations the two rods can be attached in any suitable manner such as with the use of lugs and brazing or adhesive bonding. Additionally, in other variations, the first and second rods (or similar structures) could be integrally formed such as during casting, molding or forging. The long leg 117 of the L-shaped second rod substantially forms the second extension arm section 106, which terminates at its distal end at the second dropout 110. Accordingly, the first and second extension arms are spaced from each other the length of the short leg 116. Typically the spacing between the two extension arms is around 120–140 mm. Further, the first and second extension arms are generally coplanar such that the first and second dropouts are substantially aligned with each other. As clearly shown in FIG. 3, the length of the extension arm sections is at least as long as the radius of the bicycle wheel the device is adapted to hold.

Still referring to FIG. 1, the illustrated attachment section 112 comprises an extensively wire formed portion of the first rod. The attachment section begins at a first U-shaped portion 118 that includes (i) a first leg 120 that is aligned and integral with the first extension arm 104, (ii) a base 122 that is generally arcuate and has a radius that from its inside surface is at least as great as the radius of a seatpost to which the device is adapted to be attached, and (iii) a second leg 124 that is generally parallel with the first leg with the spacing between the legs being equal or greater than the diameter of an intended seatpost. The opening or seatpost slot 126 formed by the first U-shaped portion faces in the direction of the dropouts 108 & 110.

The second leg 124 of the first U-shaped portion is integral with the top of an S-shaped portion 128 that extends substantially downwardly until being integrated with a first leg 132 of a second U-shaped portion 130. Accordingly, the second U-shaped portion is spaced apart from the first U-shaped portion a distance dictated by the configuration of the S-shaped portion. Typically the spacing between the U-shaped portions is at least a couple of inches and is usually about 4–7 inches, although spacings greater than 7 inches and less than 2 inches can be utilized in variations of the device. In addition to the first leg 132, the second U-shaped portion includes a base 134 that is generally arcuate and has a radius from its inside surface at least as great as the radius of a seatpost to which the device is adapted to be attached, and a second leg 136 that is generally parallel with the first leg with the spacing between the legs being equal or greater than the diameter of an intended seatpost. The end of the second leg 136 of the second U-shaped portion 130 also comprises the proximal end of the first rod 112. The opening or seatpost slot 138 formed by the second U-shaped portion faces in generally the opposite direction of the opening 126 of the first U-shaped portion 118. Each of the opening or slots of both U-shaped portions are substantially aligned with each wherein the radius of curvature of the base 122 & 134 of each U-shaped section share a common axis of rotation.

In the preferred embodiment, the attachment section 102 is covered with a protective covering 140. In one variation, the covering comprises a dip coated polymeric covering. In another variation, the covering comprises flexible plastic or rubber tubing that is slid over the metallic rod and into place. The protective covering may comprise other materials as well including but not limited to fabric and leather. Further, the covering may be attached to the attachment section using any other suitable method including but not limited to adhesive bonding and stitching.

Referring to the distal ends of the first and second extension arm sections, the dropouts 108 & 110 each have U-shaped slots 140 & 142 respectively that are sized to receive the ends of a typical bicycle wheel axle therein. The dropouts are spaced from each other at the distal ends of extension arm sections of the device at a distance generally corresponding to the width of a typical hub of a front bicycle wheel. The dropouts are attached to the extension arms in any suitable manner such as welding, brazing, mechanical fastening and adhesive fastening. Further, the dropouts can be integrally formed with the extension arms. For instance, a steel solid or tubular rod can be stamped to plastically deform the ends of the arms into flattened dropouts. The slots can be formed during the stamping operation or they can be cut into the formed ends in a separate operation.

Figure 2:
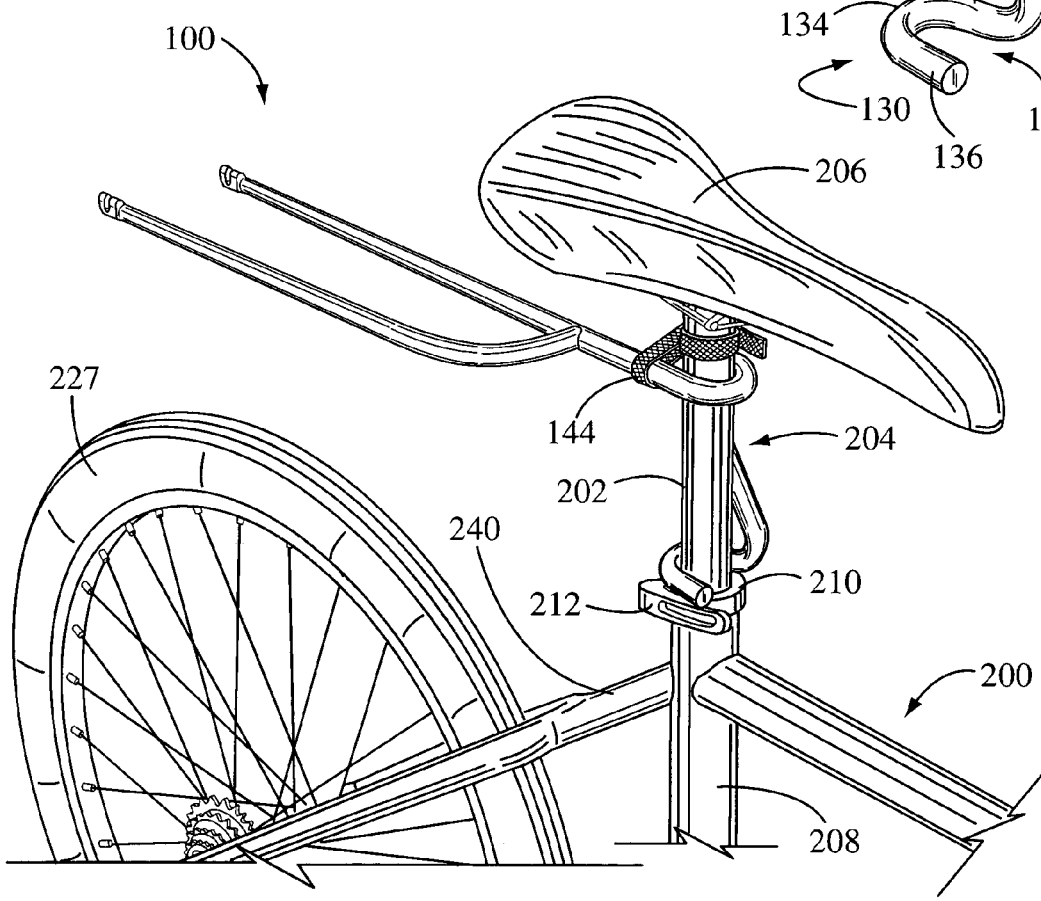
FIG. 2 is an isometric view of the preferred embodiment attached to a bicycle.
Figure 3:
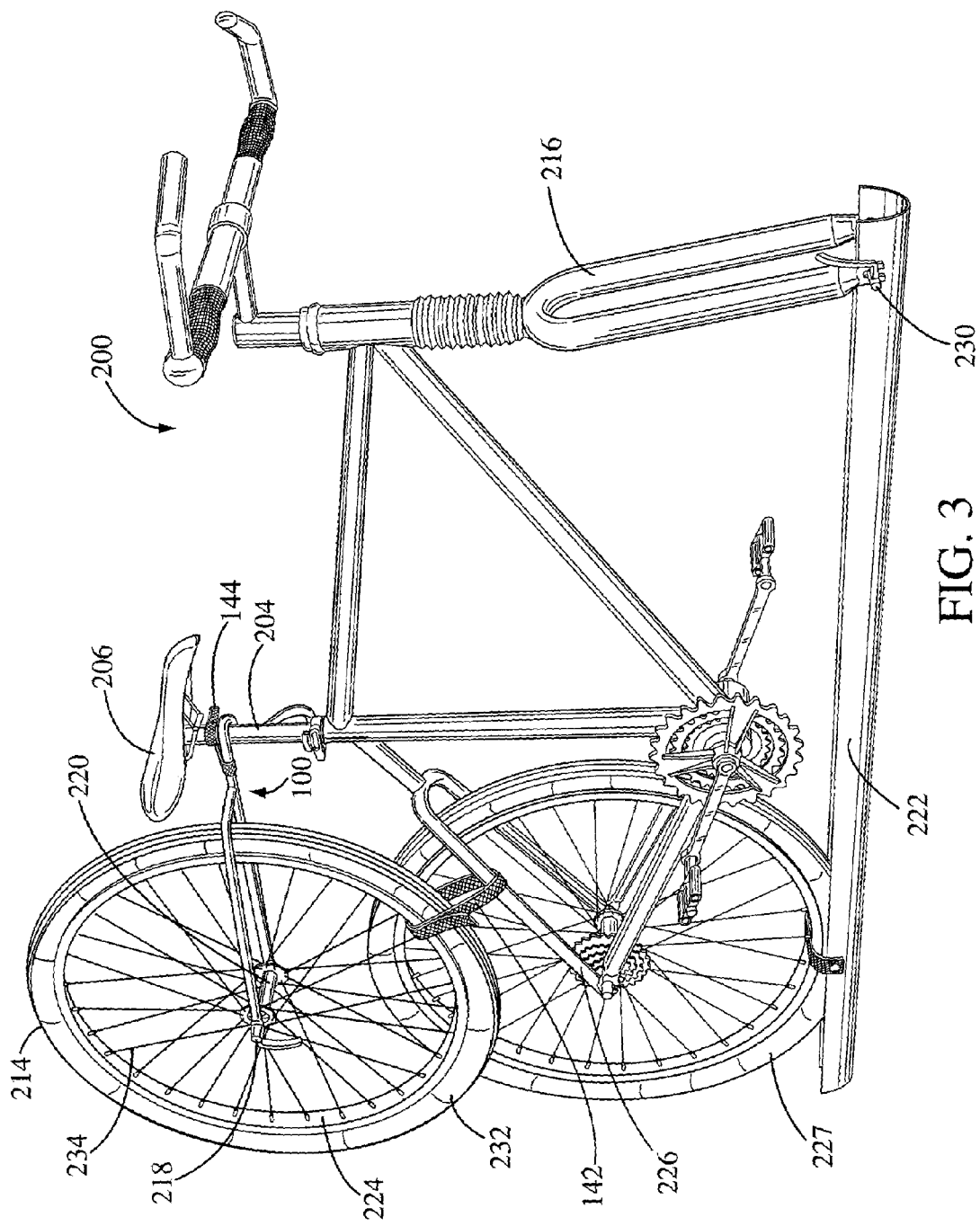
FIG. 3 is an isometric of the preferred embodiment attached to a bicycle with a wheel attached to the holding device.

Referring to FIGS. 2 and 3, the preferred embodiment device 100 is shown attached to a bicycle 200. The U-shaped portions 118 & 130 are placed around the shaft 202 of the seatpost 204 below the seat 206 such that the base 134 of the lower second U-shaped portion 130 is located behind the seatpost, and the base 122 of the upper first U-shaped portion 118 is located in front of the seatpost. The bottom of the second U-shaped portion rests on the top of the bicycle's seat tube 208, which includes the seatpost collar 210 and an associated quick-release bolt 212 or other type of suitable bolt. Accordingly, because of the weight of the extension arm sections 104 & 106, which are cantilevered off of the first U-shaped portion, and the wheel 214 when it is secured to the device, the device is prevented from pivoting downwardly. It is appreciated that the preferred embodiment does not utilize a clamping mechanism comprising interconnected moving parts, such as a hinged clamp or an endless band clamp. By foregoing such a clamping mechanism the cost of fabricating the device is reduced. Further, the manner in which the preferred embodiment wheel holding device is braced against the seatpost facilitates relatively rapid deployment and removal of the device and the associated wheel.

There is no industry standard concerning the diameter of a seatpost shaft 202. Seatpost shafts have diameters varying from 25.4 mm up to about 31 mm; however, the most common seatpost shaft diameter is around 27.2 mm with the great majority of all seatposts having a diameter range of around 26.6 mm to 27.2 mm. Accordingly, a device having U-shaped portions 118 & 130 with openings that have a width in excess 27.2 mm and a radius in excess of 13.6 mm will fit the most seatposts as the small difference in the common sizes is not significant enough to adversely effect the operation of the wheel holding device. Additionally, as market demand warrants, devices with larger or smaller U-shaped portion openings can be fabricated that will accommodate seatposts with larger and smaller shafts. Further, a cylindrical shim (not shown) fabricated of plastic or metal can placed over the seatpost shaft to increase the diameter of the shaft in the localized area where the wheel holding device is to be mounted. Accordingly, with a shim, a device with an opening width of around 27.2 mm can be used on a seatpost having a diameter of 25.4 mm.

Referring to FIG. 3, the front bicycle wheel 214 is (i) slid between the extension arms 104 & 106, (ii) received into the spaced slots 140 & 142, and (iii) secured to the device in a manner similar to securing a front wheel to the dropouts of a bicycle's front fork 216. By tightening quick release skewers 218 or tightening a bolt (not shown) onto a threaded axle, the inside surfaces of the dropouts 108 & 110 are braced against the hub 220 to secure the wheel to the device. The weight of the wheel is cantilevered by the extension arms off the seatpost shaft via the bases 122 & 134 of the U-shaped portions 118 & 130. However, when transporting the bicycle mounted on a rooftop bicycle rack of an automobile (the track 222 of a rooftop rack is partially illustrated in FIG. 3), bumps and imperfections in a roads surface can cause the front wheel and the device to bounce up and down. To stabilize the front wheel and the device and prevent undesirable movement of the front wheel, a strap 142 is provided to anchor the wheel to the bicycle. The strap is typically passed around the rim 224 of the wheel and around a seatstay tube 226 of the bicycle. Preferably, the strap comprises hook and loop material to fasten it around the bicycle and the rim, although any suitable manner and means of fastening the strap is acceptable including, but not limited to, buckles and D-rings. It is to be further appreciated that the strap may comprise any article used to stabilize the wheel including, but not limited to, cable, chain, rope and twine.

In a slight variation of the preferred embodiment device, a seatpost strap 144 can be utilized. The seatpost strap (i) wraps around proximal end of the first extension arm 104 where it merges into the first leg 120 of the first U-shaped portion 118, (ii) extends behind the seatpost 204, (iii) wraps around the second leg 124 of the first U-shaped portion proximate its intersection with the S-shaped portion 128, and (iv) is wrapped around and secured to the seatpost shaft 202. Accordingly the strap prevents the wheel 214 and extension arms 104 & 106 from bouncing upwardly during transport. Preferably, the seatpost strap uses a hook and loop material to secure it but any fastening manner and means can be used. For instance, loops (not shown) can be molded or formed into the device proximate the first U-shaped portion such that hooked ends of a rope or chain can be secured through the loops to effectively prevent the wheel holding device from bouncing.

A First Alternative Embodiment

Figure 4:
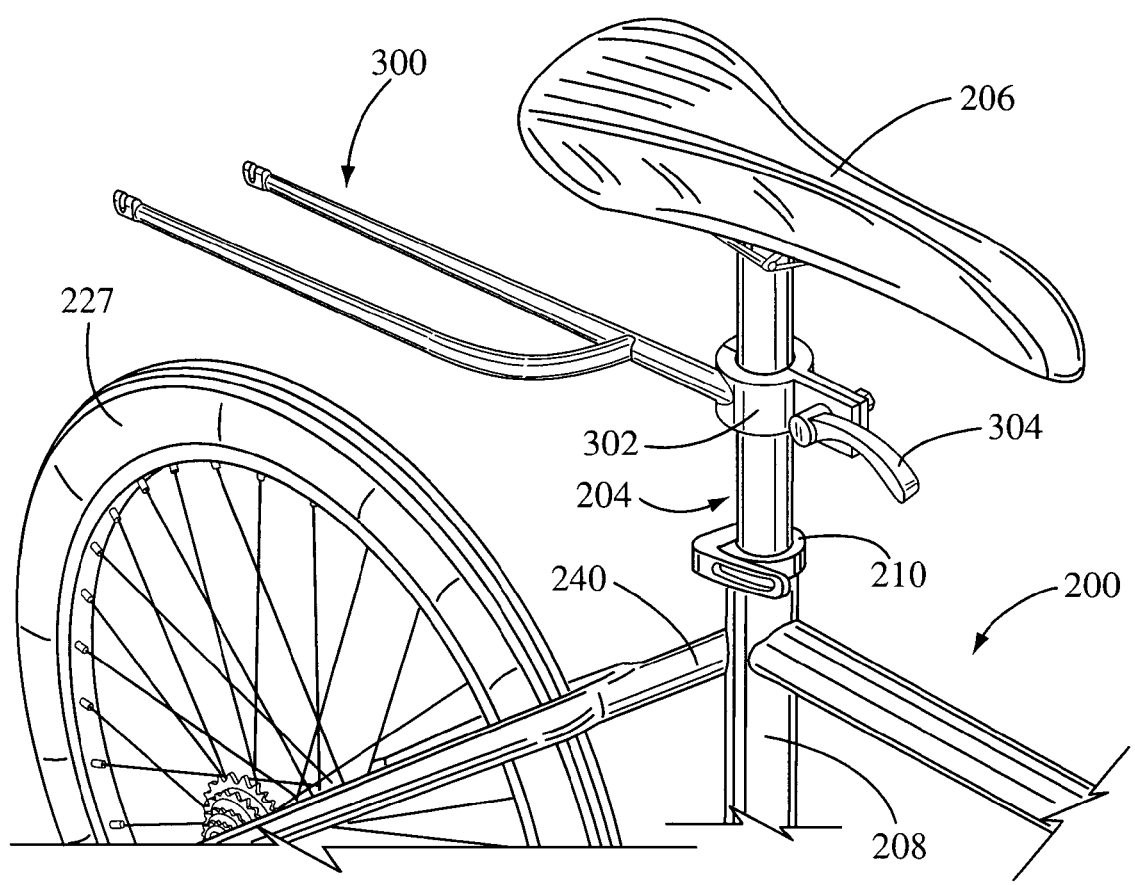
FIG. 4 is an isometric view of an alternative embodiment wheel holding device clamped to the seatpost of a bicycle.

Referring to FIG. 4, an alternative embodiment wheel holding device 300 for attaching to the seatpost 204 of a bicycle 200 is illustrated. The alternative embodiment device is generally similar to the described preferred embodiment device except that the attachment section comprises a hinged clamp 302 that wraps around and locks against the seatpost extension 202 through a lever mechanism 304.

A Method of Using the Device

Figure 5:
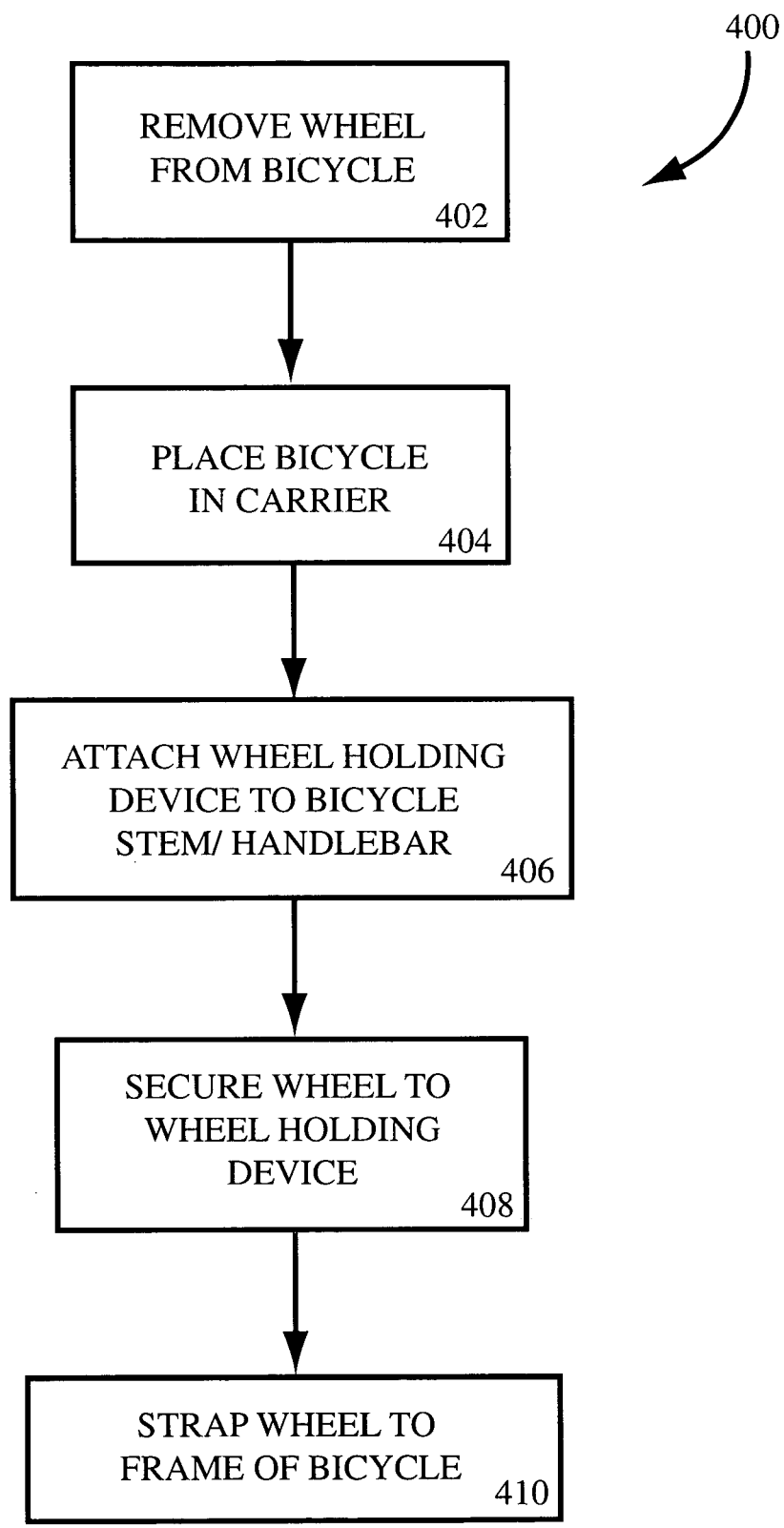
FIG. 5 is a flow chart illustrating a method of using a wheel holding device.

Referring to FIG. 5, a flow chart 400 describing the preferred use of the bicycle wheel holder device in conjunction with a rooftop or similar rack for transporting a bicycle on an automobile is illustrated.

First, as indicated in block 402, the front wheel 214 of the bicycle 200 is removed from the front fork 216 of the bicycle and is typically set aside. Next as indicated in block 404, the bicycle sans its front wheel is placed on the rooftop carrier. Typically, the rear wheel 227 is placed in a track 222 provided on the carrier and the dropout slots of the front fork are placed in a dummy axle on the carrier. A quick release cam bolt 230 or nuts (not shown) are tightened to secure the front fork to the dummy axle.

As indicated in block 406, the wheel holding device is attached to the seatpost 204. Using the preferred embodiment of the device as illustrated in FIG. 1, the user places the approximate center of the S-shaped portion 128 against or close to the seatpost shaft 202 with the extension arms 104 & 106 of the device generally vertically orientated. The device is then rotated counter clockwise as viewed in FIG. 4 to bring the seatpost shaft into openings 126 & 138 of the first and second U-shaped portions 118 & 130. The protective coating 140 of the device prevents the device from scratching or abrading the seatpost. Concerning the described alternative embodiment, the wheel holding device 300 is clamped to the seatpost.

Referring to block 408, the front wheel 214 of the bicycle 200 is secured to the wheel holding device. In both the preferred embodiment and the described alternative embodiment, the wheel is attached to the device at the axle of the wheel by clamping the axle to slotted dropouts via bolts or a quick release mechanism 218. In other variations and embodiments of the wheel holding device, the wheel can be secured to the holder by other suitable means such as but not limited to clamps or straps that restrain the rim 224, tire 232 and/or spokes 234 of the wheel to an appropriately configured wheel holding device.

Finally as indicated in block 410, the front wheel 208 is strapped to a seatstay tube 226 of the bicycle 200 as shown in FIG. 3 to prevent the wheel and wheel holding device combination from bobbing up and down during transport and to prevent any rotation of the device relative to the seatpost. Alternatively, or additionally, the wheel holding device can be strapped to the seatpost as discussed above using a seatpost strap 144. It is appreciated that a strap 142 or 144 may not be required in all embodiments of the wheel holding device.

Although the method of securing a bicycle 200 and its front wheel 208 to a rooftop bicycle rack has been described with reference to the particular order of operations illustrated in FIG. 5, the actual order of operations can vary as would be obvious to one of ordinary skill in the art. For instance, the wheel holding device and the wheel could be secured to the bicycle before the bicycle is placed in the rooftop rack. Further, the same method may be applicable to other types of racks and accordingly, the described method is not intended to be limited just to use with rooftop racks but with any suitable type of rack where a wheel of the bicycle must be removed before securing the bicycle in the rack.

Other Alternative Embodiments

The preferred embodiment and alternative embodiment of the wheel holding device as illustrated in the accompanying figures and described herein is merely exemplary and is not meant to limit the scope of the invention. It is to be appreciated that numerous variations to the invention have been contemplated as would be obvious to one of ordinary skill in the art with the benefit of this disclosure. All variations of the invention that read upon the appended claim language are intended and contemplated to be within the scope of the invention.

For instance, the shape of the wireform of the preferred embodiment device could vary substantially along with the manner in which it braces against the seatpost. Further while the device has been primarily described with reference to a wireform, alternative embodiments need not utilize a wireform, rather any type of framework is suitable that facilitates the securing of a bicycle wheel to the bicycle in the manner required by the appended claims. The device has been described herein primarily for use with a shaft of a seatpost, although variations of the device could attach to several of the various tubes of a bicycle such as, but not limited to, the seat tube 208, a seat stay 226 and the upper bridge section 240 of a unified seatstay assembly.

We claim:

1. A device for securing a bicycle wheel to a bicycle, the device comprising:
   a first arm section with proximal and distal ends;
   a first dropout attached to the distal end of the first arm section, the first dropout including a first slot, the first slot adapted to receive an end of an axle of the bicycle wheel therein;
   a second arm section with proximal and distal ends, the distal end of the second arm section being spaced from the distal end of the first arm section;
   a second dropout attached to the distal end of the second arm section, the second dropout including a second slot, the second slot adapted to receive another end of the axle of the bicycle wheel therein, the first and second slots being substantially aligned with each other;
   an attachment section, the attachment section being (i) coupled with the proximal ends of the first and second arms, and (ii) adapted to couple with a seatpost of a bicycle without the use of a clamping mechanism.

2. The device of claim 1, wherein the attachment section comprises a curved wireform, the curved wireform being adapted to at least partially wrap around the bicycle seatpost.

3. The device of claim 2, wherein the curved wireform comprises a solid rod.

4. The device of claim 3, wherein the solid rod is comprised of steel.

5. The device of claim 3, wherein the wireform is comprised of aluminum.

6. The device of claim 1, wherein the attachment section comprises first and second U-shaped portions, the first and second U-shaped portions (i) being spaced from each other and (ii) forming first and second openings respectively, the first opening being aligned with the second opening, the first opening facing in a first direction and the second opening facing in a second direction, the second direction being opposite the first direction.

7. The device of claim 6, wherein the first direction is generally towards the first and second dropouts.

8. An assembly including the device of claim 1 and a strap, the strap being adapted to wrap around a portion of the bicycle and the bicycle wheel.

9. The device of claim 2, wherein the wireform comprises a tubular shaft.

10. A device for securing a bicycle wheel to a seatpost of a bicycle, the device comprising:
    an attachment section adapted to couple to the seatpost wherein the attachment section does not comprise a clamp;
    a first arm section with proximal and distal ends, the first arm section having a length greater than the radius of the bicycle wheel and being coupled with the attachment section;
    a first dropout attached to the distal end of the first arm section, the first dropout including a first slot, the first slot adapted to receive an end of an axle of the bicycle wheel therein;
    a second arm section with proximal and distal ends, the second arm section having a length greater than the radius of the bicycle wheel and being coupled with the attachment section, the distal end of the second arm section being spaced from the distal end of the first arm section; and a second dropout attached to the distal end of the second arm section, the second dropout including a second slot, the second slot adapted to receive another end of the axle of the bicycle wheel therein, the first and second slots being substantially aligned with each other.

11. The device of claim 10, wherein the attachment section includes first and second generally U-shaped portions, the U-shaped portions being spaced from each other and forming respective first and second openings, the first and second openings being adapted to fit around a shaft of the seatpost.

12. The device of claim 11, wherein the U-shaped portions comprise a wireform.

13. The device of claim 11, wherein the U-shaped portions are at least partially covered by a protective covering.

14. The device of claim 13, wherein the protective covering comprises a polymeric material.

15. The device of claim 11, further comprising a strap, the strap being attached to the attachment section proximate one of the first and second U-shaped portions, the strap being adapted to further secure the device to the seatpost.

16. A device for securing a front bicycle wheel of a bicycle to the bicycle when the bicycle is attached to a vehicle mounted bicycle rack for transport, the device comprising:

a seatpost attachment mechanism adapted to couple with a shaft of a seatpost, the attachment mechanism not including a clamping mechanism; and a bicycle wheel attachment mechanism adapted to secure the front bicycle wheel to the device, the seatpost attachment mechanism and the bicycle wheel attachment mechanism being coupled with each other.

17. The device of claim 16, wherein the seatpost attachment device comprises first and second generally U-shaped portions, the U-shaped portions being spaced from each other and forming respective first and second openings, the first and second openings being adapted to fit around a shaft of the seatpost.

18. The device of claim 16, wherein the bicycle wheel attachment mechanism comprises two aligned slots adapted to receive end of an axle of the front bicycle wheel therein.

19. The device of claim 16, wherein the bicycle wheel attachment mechanism couples to an axle of the front wheel.

20. A combination comprising the device of claim 16, the bicycle including the seapost, the front wheel and a strap wherein: (i) the front wheel is secured to the bicycle wheel attachment mechanism; (ii) the seatpost attachment mechanism is coupled with the shaft of the seatpost; and (iii) the strap is wrapped around a portion of the bicycle and the bicycle wheel.

21. The combination of claim 20, further comprising a bicycle rack adapted for mounting to an automotive vehicle wherein the bicycle is secured to the bicycle rack.

22. The combination of claim 21, further comprising an automotive vehicle, wherein the bicycle rack is attached to the automotive vehicle.

23. The combination of claim 22, wherein the bicycle rack is attached to a roof of the automotive vehicle.

24. A device for securing a bicycle wheel to a bicycle, the device comprising:

a first arm section with proximal and distal ends;

a first dropout attached to the distal end of the first arm section, the first dropout including a first slot, the first slot adapted to receive an end of an axle of the bicycle wheel therein;

a second arm section with proximal and distal ends, the distal end of the second arm section being spaced from the distal end of the first arm section;

a second dropout attached to the distal end of the second arm section, the second dropout including a second slot, the second slot adapted to receive another end of the axle of the bicycle wheel therein, the first and second slots being substantially aligned with each other;

an attachment section, the attachment section being (i) coupled with the proximal ends of the first and second arms, and (ii) adapted to couple with a tube of a bicycle without the use of a clamping mechanism.

25. The device of claim 24, wherein the tube of a bicycle comprises one of a seatpost shaft, a seat tube, a seat stay and an upper bridge of a unified seatstay assembly.

26. The device of claim 24, wherein the attachment section comprises a curved wireform, the curved wireform being adapted to at least partially wrap around the tube.

27. The device of claim 24, wherein the attachment section comprises first and second U-shaped portions, the first and second U-shaped portions (i) being spaced from each other and (ii) forming first and second openings respectively, the first opening being aligned with the second opening, the first opening facing in a first direction and the second opening facing in a second direction, the second direction being opposite the first direction.

* * * * *